United States Patent
Krech, Jr. et al.

[11] Patent Number: 5,883,641
[45] Date of Patent: Mar. 16, 1999

[54] SYSTEM AND METHOD FOR SPECULATIVE EXECUTION IN A GEOMETRY ACCELERATOR

[75] Inventors: Alan S. Krech, Jr.; Glenn W Strunk, both of Fort Collins, Colo.

[73] Assignee: Hewlett-Packard Company, Palo Alto, Calif.

[21] Appl. No.: 837,875

[22] Filed: Apr. 29, 1997

[51] Int. Cl.$^6$ .................................................. G06F 15/80
[52] U.S. Cl. ........................ 345/505; 345/503; 345/522
[58] Field of Search .................................. 345/424–427, 345/433, 434, 441, 501–503, 514, 522, 523, 505, 506; 395/701, 704

[56] References Cited

U.S. PATENT DOCUMENTS 5,657,436  8/1997  Ashburn .................................. 345/441
5,671,401  9/1997  Harrell ................................... 345/441

Primary Examiner—Kee M. Tung

[57] ABSTRACT

A system and method for performing speculative execution of state machine operation in a graphics accelerator. In accordance with one aspect of the invention, the method includes the step of executing steps in a first state machine that is operating on a graphic primitive. As is known, a graphic primitive is defined by a plurality of vertices. In accordance with the invention, the preferred embodiment receives the coordinate parameters for the second to last primitive vertex. Then it evaluates one or more conditions that indicate whether steps in a second state machine need to be executed, based upon parameters of primitive vertices already received. It then branches to and begins executing steps in another state machine, based upon the tentative conditions, and continuing execution of the steps in the transformation state machine in parallel with the continued execution of the steps in the another state machine. After a predetermined number of states, the method reevaluates the one or more conditions, at which time the value of the one or more conditions is no longer tentative, but determinative of the next state information. Then, the method invokes a reset condition, aborts execution of the steps in the another state machine, and returns execution to a predetermined step in the first state machine, if the one or more conditions of the evaluating and reevaluating steps are inconsistent. If, however, the one or more conditions of the evaluating and reevaluating steps are equal or consistent, the method terminates the execution of the first state machine and continues executing the steps in the another state machine.

25 Claims, 6 Drawing Sheets

SYSTEM AND METHOD FOR SPECULATIVE EXECUTION IN A GEOMETRY ACCELERATOR

BACKGROUND OF THE INVENTION

1. Field of the Invention

The present invention relates to computer graphics systems and, more particularly, to a computer graphics system utilizing a graphics accelerator having an enhanced logic and register structure to achieve enhanced performance.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and α) color values of each vertex. Alpha is a transparency value. Additional primitive data may be used in specific applications. Rendering hardware interpolates the primitive data to compute the display screen pixels that represent each primitive, and the R, G, B and α values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of, for example, 64 words of 32 bits each. Additional data transmitted from the host computer to the geometry accelerator includes illumination parameters, clipping parameters and any other parameters needed to generate the graphics display.

Various techniques have been employed to improve the performance of geometry accelerators. These including pipelining, parallel processing, reducing redundance, minimizing computations, etc. in a graphics accelerator. For example, conventional graphic systems are known to distribute the vertex data to the geometry accelerators in a manner that results in a non-uniform loading of the geometry accelerators. This variability in geometry accelerator utilization results in periods of time when one or more geometry accelerators are not processing vertex data when they are capable of doing so. Since the throughput of the graphics system is dependent upon the efficiency of the geometry accelerators, this inefficient use of the processing capabilities decreases the efficiency of the graphics system. In response to this shortcoming in the prior art, a solution was developed for distributing "chunks" of data to a parallel arrangement of geometry accelerators.

Another known way of improving the throughput of a geometry accelerator is to minimize the overall amount of data that must be processed by it. One way that this has been done is to minimize redundancy in the data being sent to the geometry accelerator. While these and other techniques are known for improving the performance of geometry accelerators, further improvements are desired.

For example, it has been found that during the execution of various state machines of a geometry accelerator, there are often periods where the execution of one or more states is delayed until the execution of another state machine as completed. For example, and as will be discussed below, a geometry accelerator is generally laid out in pipelined fashion. As listed above, the principal components of a geometry accelerator include a transform block or routine, a clipping routine, a lighting routing, a plane equation routine, etc. These components are often implemented as state machines, which execute in pipelined fashion.

It has been found that execution time is often lost during the period that the primitive data is being passed from the transform state machine to the next machine in the pipeline (e.g., the clipping state machine). Alternatively, primitive data may be passed directly from the transform state machine directly to the lighting state machine or the plane equation state machine. Although the clipping state machine may be functionally adjacent the transform state machine in the pipeline, sometimes data need not be operated upon by the clipping state machine, and instead may be routed around it; for example, if a graphic primitive is entirely off screen. If the primitive is entirely off the screen, then the next primitive in the pipeline can begin processing in the transform machine. Alternatively, if the primitive is entirely on the screen and unlit, then the plane equation machine may immediately be started. Regardless of which state machine the primitive data is passed to, it has been found that there is generally some loss in time, or states, and thus the geometry accelerator sacrifices efficiency.

Accordingly, there is a desire to streamline the processing within a geometry accelerator to improve its efficiency.

More specifically, there is a desire to structure a geometry accelerator to minimize the lost time, or states, between the pipelined operation of state machines.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for performing speculative execution of state machine operation in a graphics accelerator. In accordance with one aspect of the invention, the method includes the step of executing steps in a first state machine that is operating on a graphic primitive. As is known, a graphic primitive is defined by a plurality of vertices. In accordance with the invention, the preferred embodiment receives the coordinate parameters for the second to last primitive vertex. Then it evaluates one or more conditions (tentative conditions) that indicate whether steps in a second state machine need to be executed, based upon parameters of primitive vertices already received. It then branches to and begins executing steps in another state machine, based upon the tentative conditions, and continuing execution of the steps in the transformation state machine in parallel with the continued execution of the steps in the another state machine. After a predetermined number of states (seven in accordance with the preferred embodiment), the method reevaluates the one or more conditions, at which time the value of the one or more conditions is no longer tentative, but determinative of the next state information. Then, the method invokes a reset condition, aborts execution of the steps in the another state machine, and returns execution to a predetermined step in the first state machine, if the one or more conditions of the evaluating and reevaluating steps are inconsistent. If, however, the one or more conditions of the evaluating and reevaluating steps are equal or consistent, the method terminates the execution of the first state machine and continues executing the steps in the another state machine.

In accordance with the preferred method, the invention employs one or more steps to ensure that, during the parallel execution of the first and second state machines, that any memory segments containing data values or parameters utilized by the first state machine are protected, and may not be overwritten from any other state machine. Likewise, one or more steps are provided to relinquish such protection on such memory segments, after the execution of the first state machine has terminated.

Further in accordance with the preferred method, the first state machine may be the transform state machine, which performs transformations on graphic primitives. Accordingly, the "another" state machine may be the clipping state machine, the lighting state machine, the shading state machine, the plane equation state machine, etc. Finally, the step associated with the reset condition and returning execution back to the first state machine, preferably operates by asserting a power-up reset line, which causes a ROM (containing program execution code) to go to a predetermined address and begin executing steps at that address.

In accordance with another aspect of the present invention, a system is provided for improving execution in a graphics accelerator structured to have a plurality of state machines, wherein the plurality of state machines share some common resources, such as a common data bus, a common control bus, and a common arithmetic logic unit. The system includes a controller for controlling the execution of the plurality of state machines, wherein the controller is particularly adapted to provide limited parallel execution of the plurality of state machines. That is, certain portions or steps of differing state machines may be simultaneously executed. The system further includes a read only memory (ROM) containing program code executed by the controller, and a code location (preferably a status register) includes information relating to branching conditions. A first state machine is configured to execute a plurality of steps, and has a predetermined ending state S1. Second and third state machines are defined by the controller to execute after the first state machine has substantially executed, but the second and third state machines have one or more steps that may be executed in parallel with one or more steps of the first state machine. Evaluation means are configured to evaluate the code location at a state S2 that occurs prior to the occurrence of state S1. Branching means are provided to branch to the second state machine, based upon the output of the evaluation means, prior to the occurrence of state S1. At this time, the controller is operating to allow simultaneous execution of steps in both the first and second state machines. Reevaluation means are operative upon or after the occurrence of state S1, for reevaluating the code location. If the code location has changed since the evaluation by the evaluation means (indicating that the branching means branched to the wrong state machine), then a termination means is operative to terminate the execution of the second state machine and return operation back to the first state machine. If, however, the code location has not changed (indicating that the branching means branched to the proper state machine), then means are provided to terminating the execution of the first state machine. Typically, this will include freeing up any memory areas, which otherwise protect data being operated upon by the first state machine.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
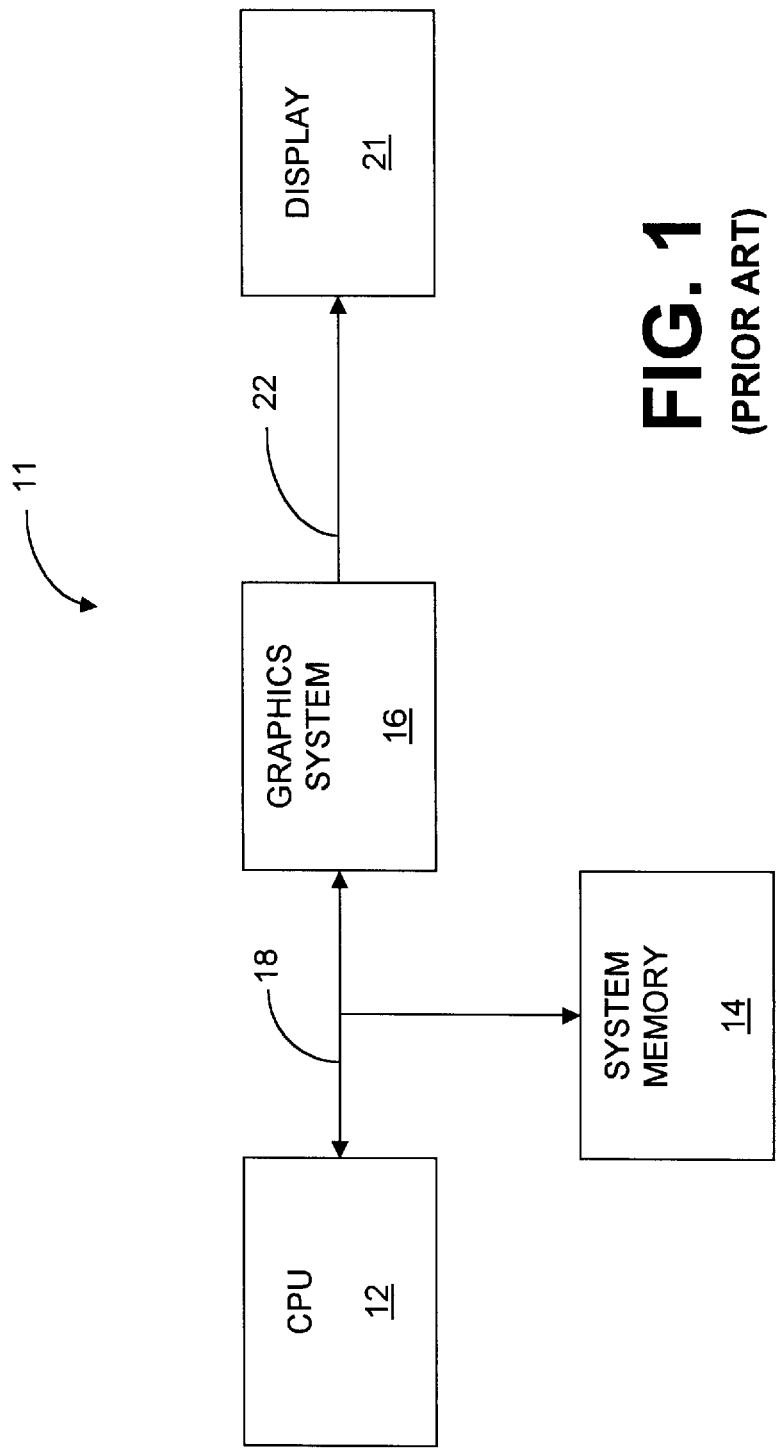
FIG. 1 illustrates a block diagram of a computer graphics system in accordance with the prior art.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 2:
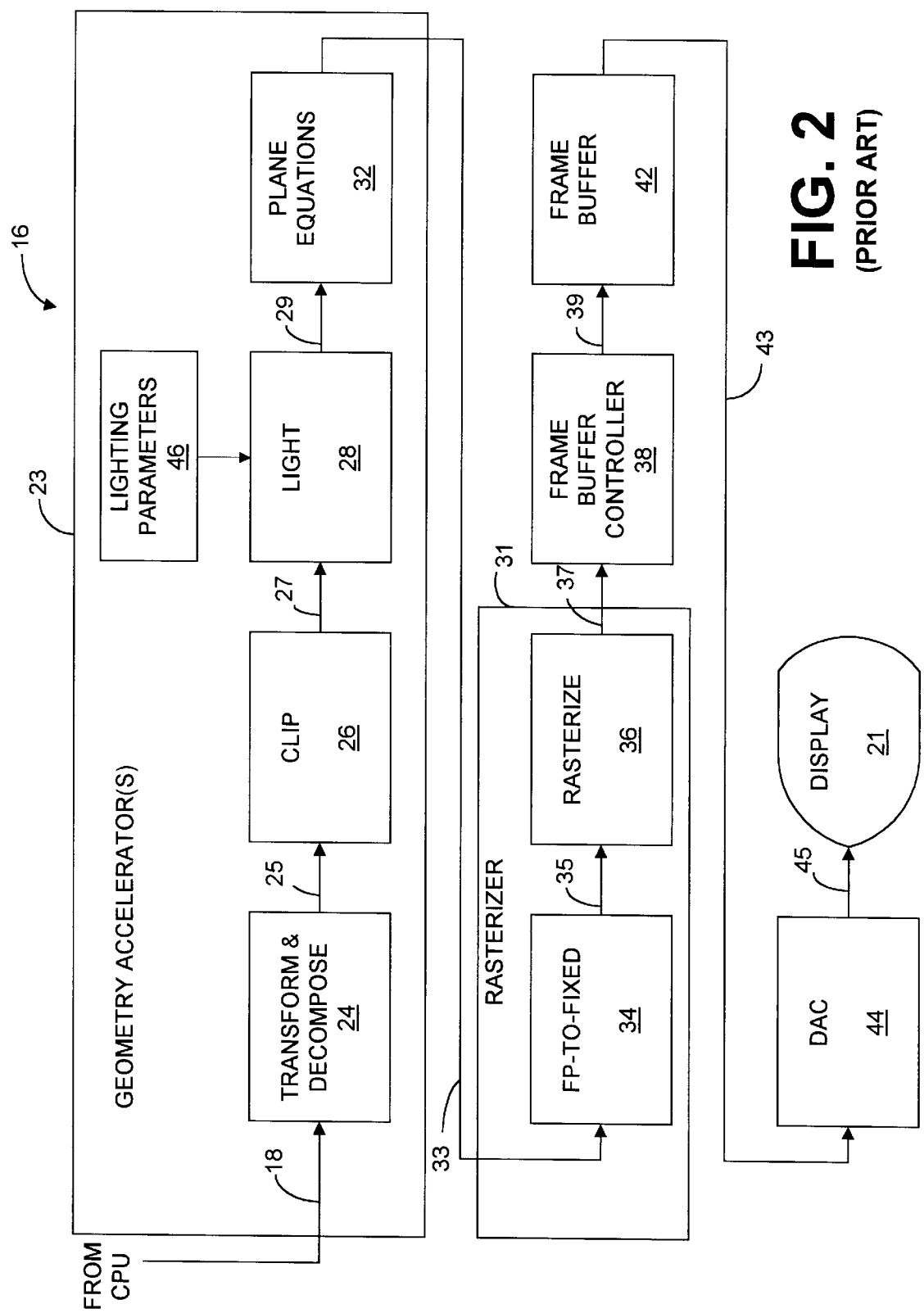
FIG. 2 illustrates a block diagram of a geometry accelerator and rasterizer of a computer graphics system in accordance with the prior art.

The basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the user relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 determines how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

As stated above, the operations of the geometry accelerator are computationally very intense because of the large volume of data transferred between the host computer and the geometry accelerator and because of the fact the geometry accelerator normally is required to perform several hundred million floating point calculations per second. In accordance with the present invention, it has been determined that the throughput of the computer graphics display system can be improved by increasing the transition speed between successive functions and/or employing parallel operation of the geometry acceleration state machines, where possible.

Figure 3:
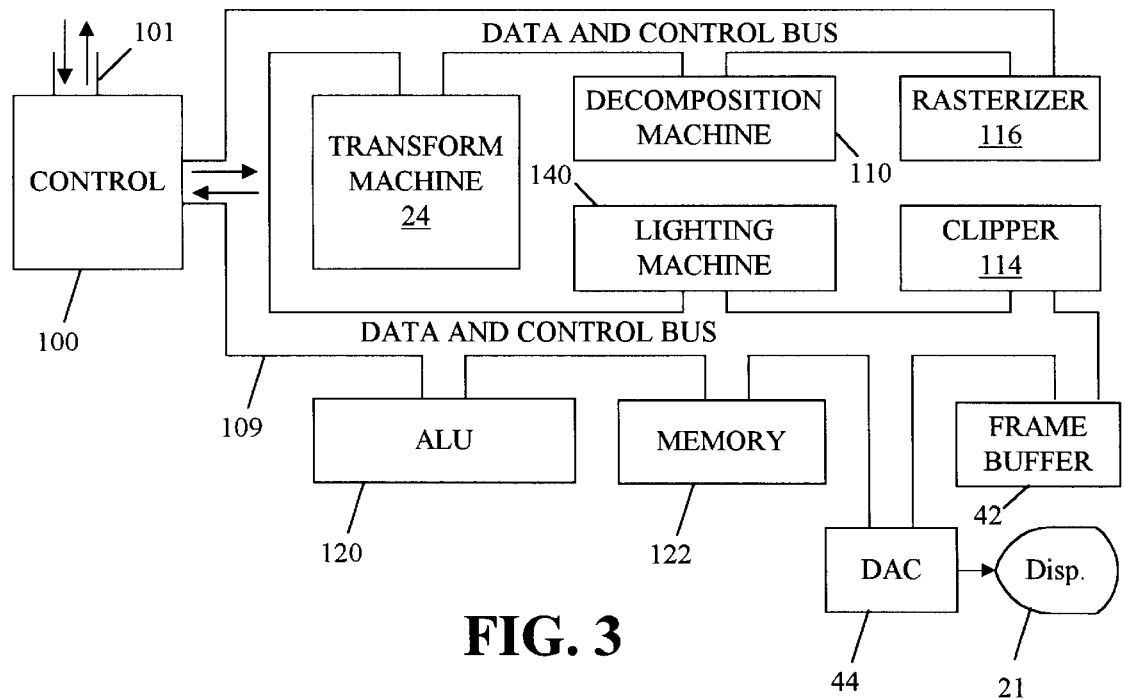
FIG. 3 is a block diagram of the geometry accelerator that illustrates various computational state machines and physical interconnections between the components.

Reference is now made to FIG. 3, which is a block diagram illustrating a more physical (as opposed to functional) layout of the graphics pipeline. Specifically, the geometry accelerator chip of the preferred embodiment of the present invention includes a controller 100 that communicates with a CPU 12 (see FIG. 1) across a channel 101. The controller 100 communicates with the various state machines, internal memory 122, arithmetic logic unit (ALU) 120, and other devices by way of a common data and control bus 109. More specifically, the transform state machine 24, decomposition state machine 110, lighting state machine 112, and clipper state machine 114 are all in communication with the controller 100 and each other by way of data and control bus 109. FIG. 3 also illustrates that the rasterizer 116, frame buffer 142, digital to analog converter (DAC) 44 are also in communication across the same bus. It will be appreciated that, consistent with the concepts and teachings of the present invention, these latter-mentioned devices may be implemented externally to the geometry accelerator chip, and therefore in communication with the chip via a separate control path.

While the graphics accelerator chip of the present invention is broken down into functional sub-units that are described as a graphics pipeline, it will be appreciated that the chip does not comprise a pipeline according to the conventional use of the word. In this regard, pipeline architecture usually connotes parallel activity. That is, if a pipelined device is partitioned into multiple stages, once the first stage of the pipeline completes its processing on a portion of data, it passes that portion of data or information onto the second stage of the pipeline. At that time, the first stage may receive its next set of data or information and begin processing on it. In this way, each stage of a traditional pipeline may process data in substantially parallel fashion with the other stages of the pipeline.

The geometry accelerator of the present invention is different in that, although it is characterized as a pipeline, some of the various functional segments do not operate in traditional pipeline fashion. Instead, a graphics primitive, whether it be a single vertex, a line segment, a triangle, or a quadrilateral, is read into the first stage of the pipeline (the transform and decomposition stage). Various information about the vertices of the graphics primitive is stored in a common internal memory segment 122. Once the first stage of the pipeline has completed its processing of the primitive, it passes the primitive onto the next stage. This graphic primitive is then passed from stage to stage as the geometry accelerator further processes the primitive. Each state machine and pipeline may access known memory locations to retrieve parameters and information relating the vertices of the graphic primitive. The geometry accelerator will substantially complete the processing on the graphic primitive, before retrieving the next primitive from the CPU 12.

Notwithstanding this general operation of the geometry accelerator of the present invention, it has been found that the processing of a given primitive may be enhanced by providing at least limited parallel processing between two or more of the functional state machines. This is particularly true at times when the functional operations on a graphic primitive are being passed from state machine to state machine.

Figure 4:
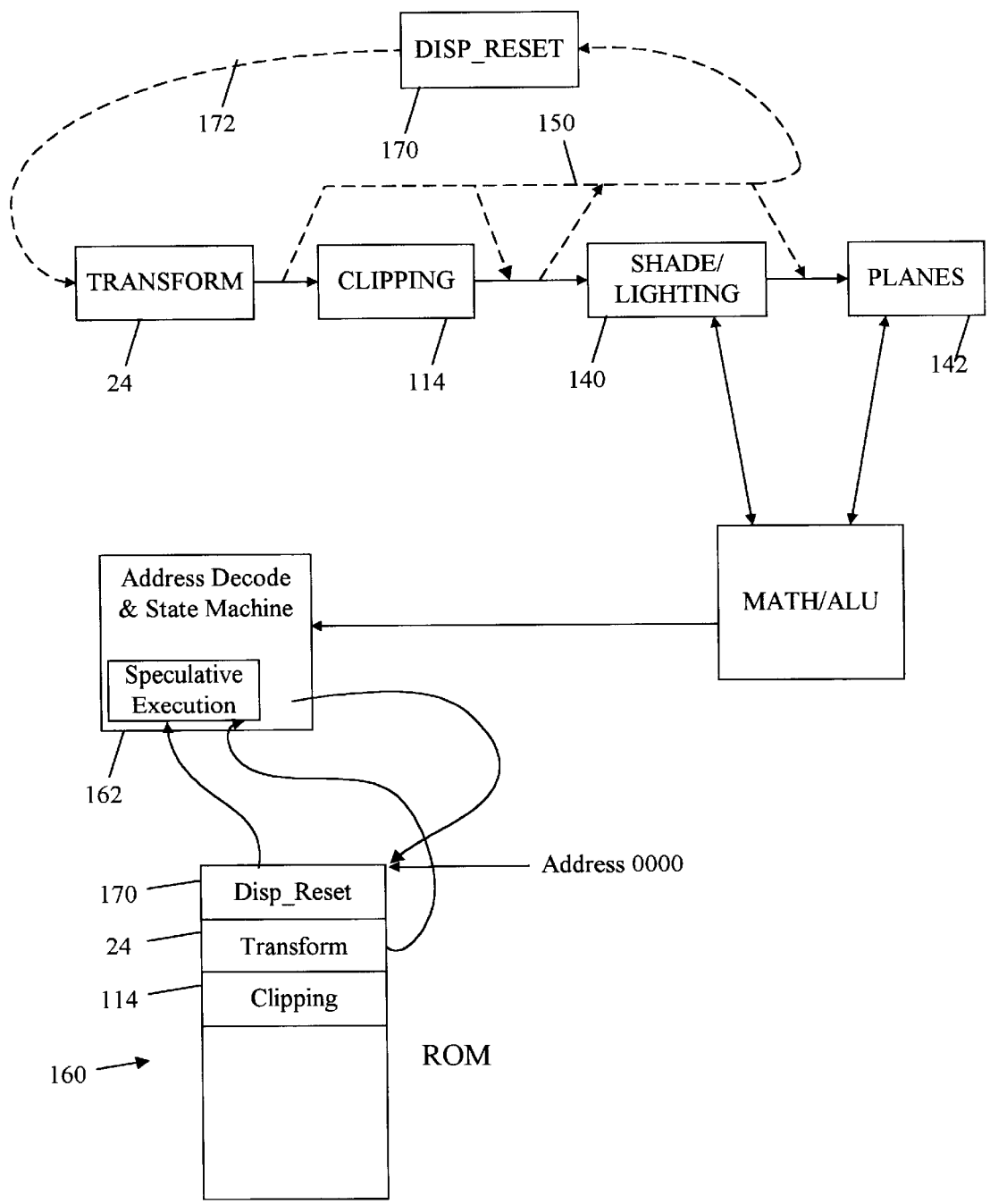
FIG. 4 is a block diagram illustrating the principal functional components of the speculative execution system constructed in accordance with a preferred embodiment of the present invention.

To better illustrate this concept, reference is made to FIG. 4, which illustrates several of the functional blocks of a graphics accelerator constructed in accordance with the present invention. These include the transform function 24, the clipping function 114, the shading function 140, and the state machine for computing the plane equations 142. As is illustrated by dashed lines 150, however, for a given graphic primitive, the computational processing by each of the state machines need not necessarily be performed. For example, suppose three vertices defining a triangular graphic primitive are received and operated upon the transform state machine 24. Further assume that it is determined that each of the vertices defining the triangular primitive would be off the display 21, and therefore not visible to a user. In such an instance, it would be both unnecessary and a waste of resources to perform the various clipping and lighting computations on that graphic primitive. Instead, those routines could be bypassed (as indicated by dashed lines 150), and the primitive could be passed on down the pipeline for any further, relevant processing. Otherwise, a new primitive could be read in from the CPU, and operated on accordingly.

This type of conditional processing, however, is known by the applicant. The advancement made by way of the present invention is directed to the speculative execution of the various state machines upon a graphic primitive. To further explain, and again referencing dashed lines 150, for a given graphics primitive it may be determined that after the primitive is processed by the transform state machine 24, further processing by one or more of the remaining state machines may or may not need to be performed. A central aspect of the present invention is in determining in advance whether or not a particular state machine will operate upon a given primitive. As previously mentioned, a graphic primitive that is entirely off screen would bypass the clipping 114, shading 140, and plane equations 142 state machines. On the other hand, a graphic primitive that is entirely on the screen would bypass the clipping 114 state machine, but nevertheless be operated upon by the shading 140, and possibly plane equation 142 state machines. A principal aspect of the present invention is, more specifically, to determine in advance whether a graphic primitive being presently operated upon by the transform state machine 24 will be operated upon by the clipping state machine 114, or whether the clipping function may be bypassed.

It has been found that by waiting until the processing of the transform state machine 24 is entirely completed before making the determination as to which state machine will next process the graphic primitive, several idle or wasted states result. Since a given graphic screen may include thousands, if not millions, of graphic primitives to be processed, these wasted states have significant performance impact.

In accordance with the invention, logic is provided with the transform state machine 24 to make an "education guess" as to whether the clipping state machine 114 needs to process the graphic primitive, or otherwise whether the clipping state machine 114 may be bypassed. This speculative determination is preferably made at a time when the second to last primitive vertex is being processed by the transformed state machine 24. In the case of a triangle primitive, this would be after the second vertex has been received and evaluated. In the case of a quadrilateral, this determination would be made after the third primitive vertex had been received. In essence, the present invention operates to evaluate those primitive vertices which have already been received, and determine whether clipping need be performed. For example, in a triangular graphic primitive, if a first vertex is on the screen, and a second vertex is off the screen, the invention will assume that clipping will need to be performed on this graphic primitive, and as the performance of the transform state machine 24 nears the end, the system will begin the early states of the clipping process. In contrast, in certain situations if both of the received vertices are off screen, then the system will assume that neither clipping nor lighting need be performed on the instant graphic primitive, and will bypass both of those state machines. Similarly, if both of the vertices received are on screen, the system will assume that no clipping need be performed, but will assume that lighting calculations will need to be made, and therefore will proceed to the lighting state machine 140.

Figure 5:
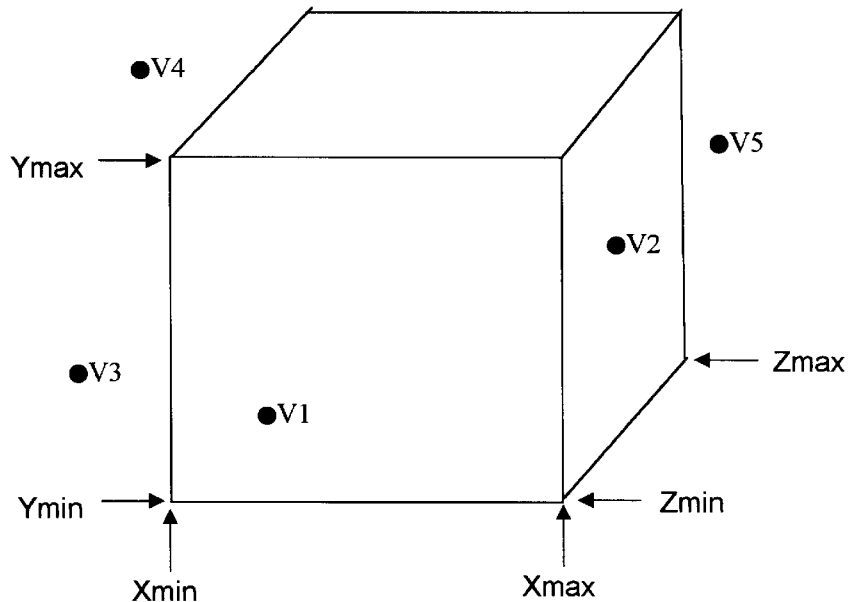
FIG. 5 is diagram illustrating three-dimensional space, and the generation of condition codes utilized by the present invention.

To better illustrate, reference is made briefly to FIG. 5, which shows a three dimensional cube structure that defines the boundaries of a graphic scene to be displayed. Vertices or objects falling within the dimensions defined by Xmin, Xmax, Ymin, Ymax, Zmin, Zmax, will be displayed on the display screen 21. FIG. 5 further illustrates five vertices, V1 through V5. As is illustrated, vertices V1 and V2 fall within the limits defined by the perspective three dimensional minimums and maximums. Vertices V3, V4, and V5, however, fall outside the limits to be displayed on the display 21. As more particularly detailed in Table 1 below, the Xmin, Xmax, Ymin, Ymax, Zmin, and Zmax condition codes for vertices V1 through V5 are presented.

TABLE 1

| Vertex | Xmin | Xmax | Ymin | Ymax | Zmin | Zmax |
|--------|------|------|------|------|------|------|
| V1 | 0 | 0 | 0 | 0 | 0 | 0 |
| V2 | 0 | 0 | 0 | 0 | 0 | 0 |
| V3 | 1 | 0 | 0 | 0 | 0 | 0 |
| V4 | 0 | 0 | 0 | 1 | 0 | 0 |
| V5 | 0 | 1 | 0 | 0 | 0 | 0 |

It is assumed that each condition code is represented by a single digital bit of information. A zero indicates that the vertex is within the prescribed limits, while a one indicates that the vertex is outside the prescribed limit. It will be appreciated that, if any one of these values is a one, then that particular graphic vertex will be off the screen. Therefore, branching hardware may be relatively simply employed in the way of an OR gate. That is, each of the bits, Xmin, Xmax, Ymin, Ymax, Zmin, Zmax., may be fed into an OR gate. If the output of the OR gate is a logic zero, then it will be recognized that the particular vertex is on the screen. In the case of a triangle primitive, if the outputs of the two OR gates utilized for the first and second vertices are zero, then the system recognizes that both of the received vertices are on the screen. It will then assume that the third vertices will be on screen, and that therefore, no clipping operations need be performed. Alternatively, if the output of the OR gate for the first vertices is zero and the output of the second OR gate is a one, then the system will presume that the clipping function will need to be performed, and will branch to that sub routine. In this regard, the various bit values, Xmin, Xmax, Ymin, Ymax, Zmin, and Zmax, may be referred to as condition codes.

It will be appreciated that, although the output of each OR gate may be a one, indicating that the particular vertex is off the screen, that in and of itself does not necessarily mean that the clipping function need not be performed. For example, vertex V3 is within the range of Y and Z coordinates, as is vertex V5. However, vertex V3 exceeds the Xmin value, while vertex V5 exceeds the Xmax value. Therefore, it will be appreciated that the line interconnecting the two vertices will extend through the visible display boundaries. Therefore, clipping will need to be performed on this primitive. Since the criteria in determining whether or not clipping and/or the other various routines need to be performed on a given graphic primitive are known, a discussion of these various criteria need not be presented or discussed herein. Instead, the functionality of the present invention is to make these assessments ahead of time (tentatively) and branch to the appropriate state machine routine.

It is a further feature of the present invention to, at an appropriate time, ensure that the tentative branch was properly made. In accordance with this feature, the tentative or speculative branch is made upon receiving the second to last vertex of a graphic primitive. Once the last vertex is received, then in a manner that is known, the system can determine the next functional block that is to process the graphic primitive. The system then compares this assessment with the speculative assessment that was made and tentatively proceeded upon. If the results are the same, then the system may continue processing in the state machine tentatively branched to. Otherwise, processing of this state machine should be halted and the operation returned to the appropriate state machine. For example, when processing a triangular primitive, if the first two vertices were identified as being in the viewing area, then the system will speculatively branch around the clipping state machine 114 and proceed to the lighting or shading state machine 140, if lighting is on (otherwise it branches to plane equations machine). If, however, the third and final vertex received is off the screen, then it may be necessary for the system to terminate the processing of the lighting machine and return to the clipping machine 114 for appropriate processing there.

Another significant aspect of the present invention is to preserve the integrity of data values presently being operated upon by the active state machine (e.g., transform state machine 24). As was described in connection with FIG. 3, the various state machines in the graphic pipeline share a common memory 122. The vertices of a particular graphic primitive are received from a CPU 12 and read into the memory 122. As these values are processed and other values or parameters associated with the graphic primitive are operated upon, they may be updated by the various operative state machines. Therefore, it is important that certain values be preserved or protected from being prematurely overwritten by a subsequent state machine during the tentative branch. For example, if the speculative branch assumes that a graphic primitive presently being operated upon by the transform state machine 24 need not be operated upon by the clipping state machine 114, but instead is to bypass the clipping machine 114 and proceed directly to the lighting machine 140, any data locations in memory 122 that may be affected by the operation of both the transform state machine 24 and the lighting state machine 140, need to be protected during this period of the tentative branch. Similarly, any data values or locations needed for operation of the clipping machine 114 need to be protected. However, once the first state machine (e.g., transform state machine 24) has completed the processing on the graphic primitive, and the system has double checked the condition codes to ensure that the speculative branch was properly made, then these data values/memory locations may be freed up and therefore overwritten if necessary by subsequent state machines.

Referring again to FIG. 4, the logic that contains the operation of the various state machines is implemented in a ROM 160. In addition, an address decode and state machine 162 of the geometry accelerator, which includes speculative execution logic, forms part of controller 100 of FIG. 3,. This is also known as the speculative execution logic. One novel aspect to the operation of the present invention relates to the termination or reset of the speculatively branched to state machine. Upon reevaluation of the condition codes, after completion of the operation of the first state machine (e.g., state machine 24), the present invention implements this reset/tennination feature by way of actuating a physical power-up RESET line of the internal ROM 160. Upon receiving a power up RESET, the ROM 160 is configured to begin execution of its internal code at a predetermined address, preferably address zero (0000). A DISPATCHER_ RESET routine 170 is programmed and stored at this predetermined address. Therefore, this routine will be executed, not only upon the initial system reset, but upon determination that a tentative branch in accordance with the invention was improperly made.

As illustrated, the ROM 160 is subdivided or segmented to include program code for executing the various state machine routines, such as the transform routine 24, the clipping routine 114, etc. Upon receiving a power-up RESET, the ROM 160 will proceed directly to address zero, and begin execution of the DISPATCHER_RESET routine 170. As illustrated by dashed line 172, the DISPATCHER_ RESET routine 170 will return operation to the transform state machine 24. During operation of the system, suppose a graphic primitive being operated upon by the transform machine 24 is evaluated at an appropriate time to bypass the clipping machine 114 and proceed directly to lighting or shade machine 140. Subsequently, the system evaluates the condition codes at the end of the transform routine 24 to determine that, in fact, the clipping machine 114 needs to be executed. The system will respond by generating a power-up RESET condition that will cause the ROM 160 to proceed to the DISPATCHER_RESET routine 170. As a result, the lighting machine 140 will terminate its temporary operation, and control will be returned to the transform routine 24, via the DISPATCHER_RESET routine 170. Since the transform machine 24 was at the end of its processing, it will then allow immediate branching to the clipping machine 114.

The practical effect of the present invention is to allow and in fact achieve efficiency gains in those instances where the tentative or speculative branching is correct, but to essentially suffer no diminution in efficiency by virtue of improper speculation. The result is, thus, a win-win situation, and performance of the geometry accelerator is significantly enhanced.

Figure 6:
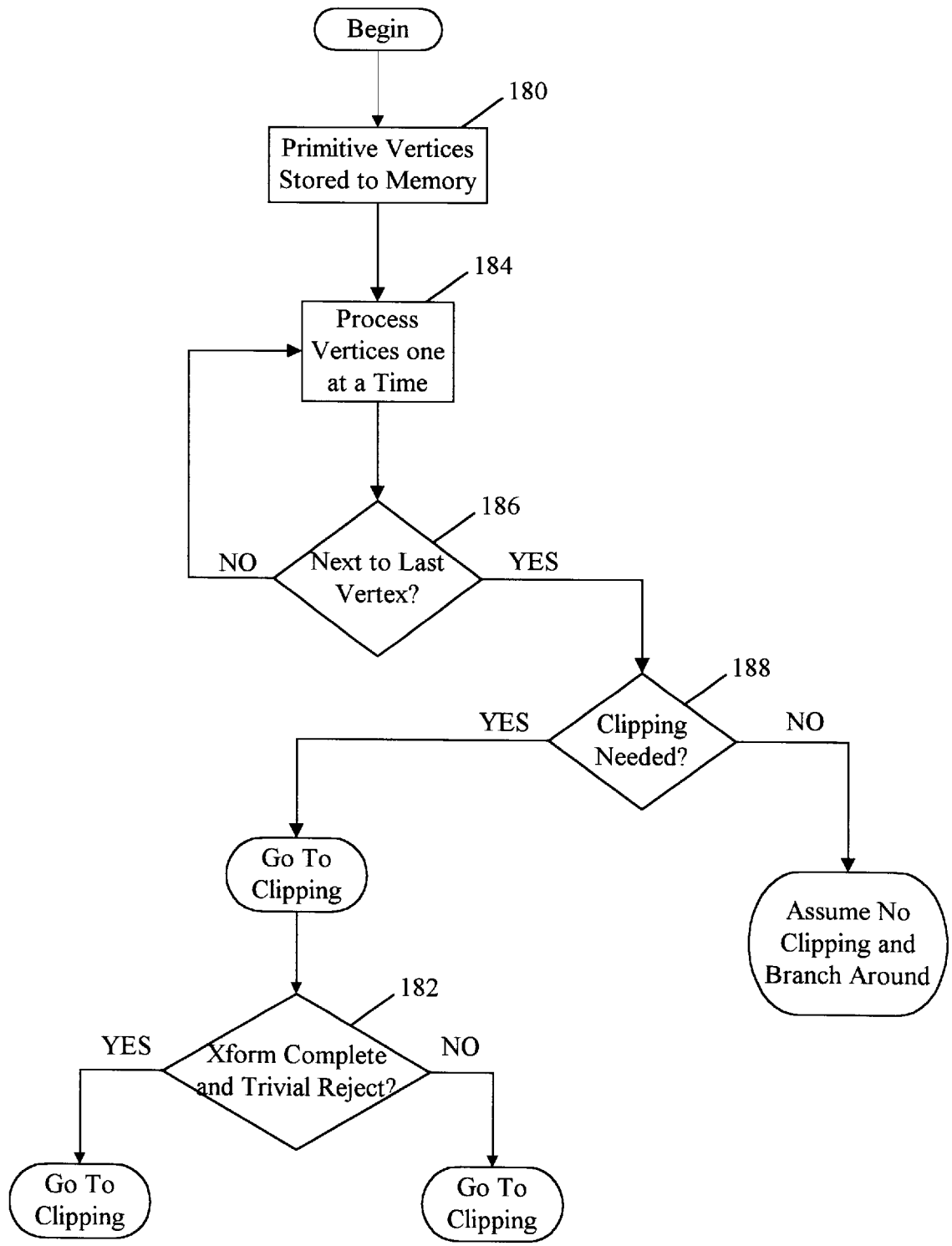
FIGS. 6 and 7 are software flowcharts illustrating the primary operational steps executed in accordance with the method of the preferred embodiment of the present invention.
Figure 7:
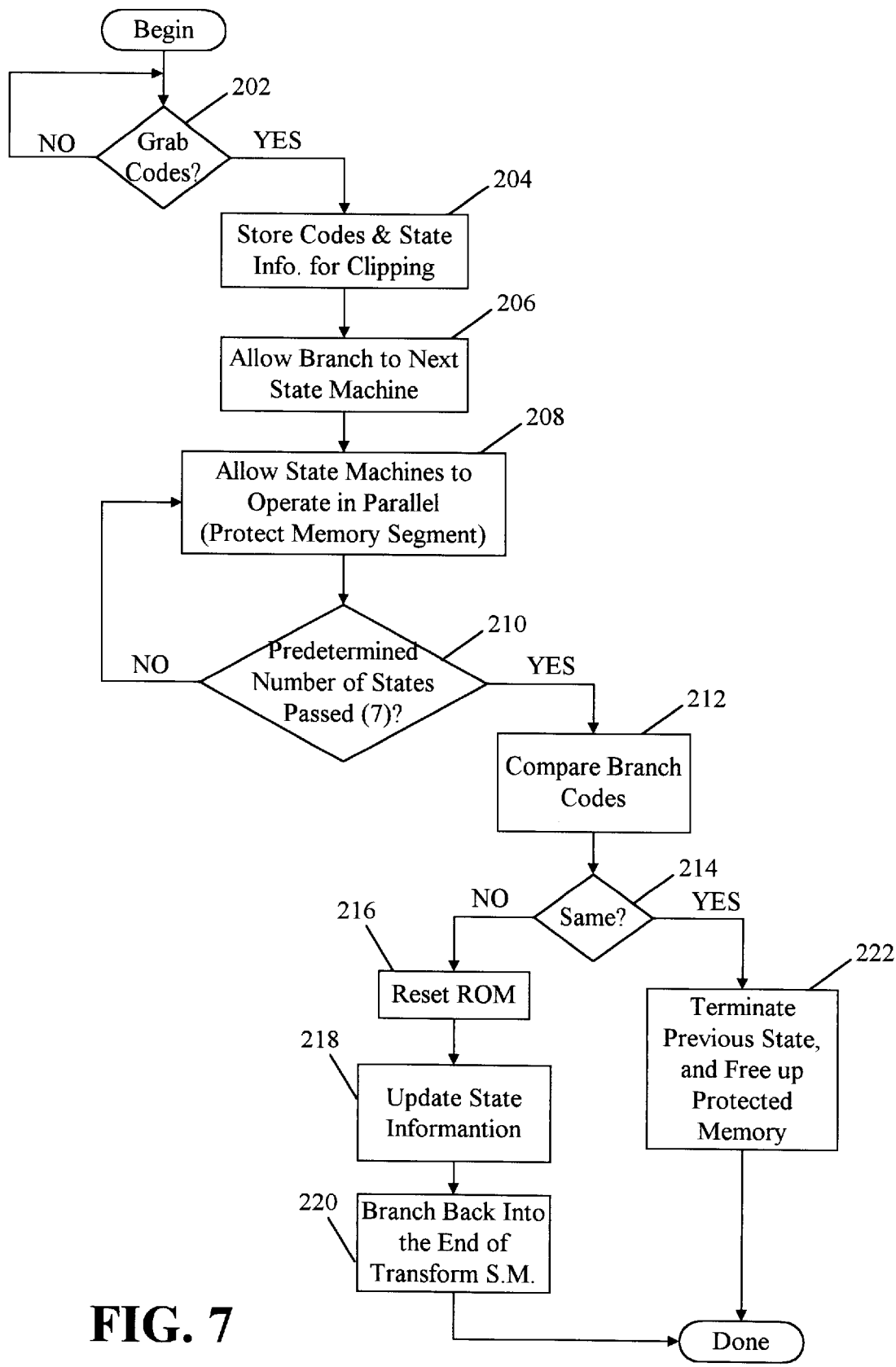

To reinforce the description of the operation of the invention, reference is made to FIGS. 6 and 7, which present software flowcharts depicting the top-level operation of the present invention. Referring first to FIG. 6, the system receives the plurality of primitive vertices from a CPU 12 and stores them to memory (step 180). As previously mentioned, there may be one to four vertices in a given primitive, depending upon whether the primitive is a point, a line segment, a triangle, or a quadrilateral, respectively. The system then proceeds in the processing of the transformation machine 24. In this regard, it will process primitive information one vertex at a time (at step 184). If, at step 186, it determines that it has received the next to last vertex, then the system will branch to step 188, where it determines whether or not it will proceed (tentatively) to the clipping machine or branch around the clipping machine. This determination may be made in manners that are already known, and for this reason will not be described herein. If clipping is needed, then the system may (at step 182), in a manner previously mentioned, determine whether to trivially accept or reject the primitive. That is, if all vertices are within the viewing area, the system will trivially accept the primitive and may skip the clipping operation. Similarly, if it is determined that all vertices are outside the viewing area, as well as all line interconnecting the vertices, then the system may likewise skip the clipping operation.

Turning now to FIG. 7, a more detailed description is presented in regard to the tentative branching area. At step 202, the system grabs the condition codes, previously described, and evaluates these codes in connection with tentative branch. It also saves these codes at step 204 for later reevaluation. At step 206, the system branches (tentatively) to the next state machine that is determined for operation. The system then allows the completion of the transform state machine 24 to operate in parallel with the branched to state machine for a limited number of states, while the transform state machine 24 completes operation on the final vertex. During this time, the system protects the relevant memory locations that are operated upon, or which may be operated upon, by the transform state machine (step 208). Once a predetermined number of states have passed, seven states in the preferred embodiment, the system then recognizes that the transform state machine 24 has completed its operation, and the system may then reevaluate the condition codes to ensure that a proper tentative branch was taken (step 210). In this regard, the system again retrieves the condition codes from the register where they are stored and compares them to the condition codes previously retrieved and saved at step 204 (step 212). If they are the same (step 214), then the system will terminate the previous step (the transform machine 24), and free up any protected memory areas associated with the performance of that state machine (step 222). If, however, the condition codes are not the same, the system has guessed incorrectly as to the next state machine to execute, and it generates a power-up RESET for the ROM 160 (step 216). The system will then update the state information (step 218) and branch back to the end of the transform state machine operation (step 220). Thereafter, the system may branch to the appropriate state machine for operation.

While the foregoing has given a basic description of image generation and primitive manipulation in a graphics accelerator, it should be appreciated that many areas have been touched upon only briefly, for purposes of illustrating the invention herein. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programming Guide, by OpenGL Architecture Review Board—Jackie Neider, Tom Davis, and Mason Woo, an Addison-Wesley Publishing Company, 1993, which is hereby incorporated by reference.

As a final note, the preferred embodiment of the present invention is implemented in a custom integrated circuit, which serves as a single-chip geometry and lighting assist for a focused set of 3D primitives. Although the discussion above has focused upon triangle primitives, the chip performs geometric transformation, lighting, depth cue, and clipping calculations for quadrilaterals, triangles, and vectors. This chip receives modeling coordinate polygon and vector vertices from a host CPU 12, transforms vertex coordinates into screen space, determines vertex colors, decomposes quadrilaterals into triangles, and computes the triangle plane equations. It also performs 3D view clipping on the transformed primitives before sending the resulting triangles and vectors to a scan converter for rendering.

This custom integrated circuit supports many combinations of primitives and features, but as will be appreciated, when an application program uses an unusual feature, much of the computational work falls back on the host software. In those cases, the graphics pipeline is implemented in software and commands for the scan converter are passed through the custom integrated circuit. Alternatively, the software may supply device coordinate primitives to the custom integrated circuit to take advantage of its internal hardware that performs the plane equation work for the downstream scan conversion hardware.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for performing speculative execution of state machine operation in a graphics accelerator, comprising the steps of:
   (a) executing steps in a graphic primitive transformation state machine;
   (b) receiving second to last primitive vertex parameters into the transformation state machine;
   (c) evaluating branch codes that indicate whether steps in a clipping state machine need to be executed, based upon the primitive vertex parameters already received;
   (d) branching and beginning execution of steps in another state machine, based upon tentative values of the branch codes, and continuing execution of the steps in the transformation state machine in parallel with the execution of the steps in the another state machine;
   (e) reevaluating the branch codes after a predetermined number of states, at which time the value of the branch codes is no longer tentative, but determinative of the next state information;
   (f) invoking a reset condition, aborting execution of the steps in the another state machine, and returning execution to a predetermined step in the transformation state machine, if the branch codes of the evaluating and reevaluating steps are inconsistent; and
   (g) terminating the execution of the transformation state machine and continuing the execution of the steps in the another state machine, if the branch codes of the evaluating and reevaluating steps are consistent.

2. The method as defined in claim 1, wherein the branching step (d), further includes the step of protecting state information needed for downstream execution.

3. The method as defined in claim 2, wherein the terminating step (g) further includes the step of releasing the protection of the state information needed for downstream execution.

4. The method as defined in claim 1, wherein the another state machine is a clipping state machine.

5. The method as defined in claim 1, wherein the another state machine is a plane equation state machine.

6. The method as defined in claim 1, wherein the another state machine is a shading state machine.

7. The method as defined in claim 1, wherein the step of invoking a reset condition includes asserting a power-up reset signal for read only memory (ROM) containing state machine execution code.

8. The method as defined in claim 1, wherein the branch codes include vertex coordinate information.

9. A method for performing speculative execution of state machine operation in a graphics accelerator, comprising the steps of:
   (a) executing steps in a first state machine operating on a graphic primitive;
   (b) receiving second to last primitive vertex parameters;
   (c) evaluating one or more tentative conditions that indicate whether steps in a second state machine need to be executed, based upon the primitive vertex parameters already received;
   (d) branching and beginning execution of steps in another state machine, based upon the tentative conditions, and continuing execution of the steps in the transformation state machine in parallel with the continued execution of the steps in the another state machine;
   (e) reevaluating the one or more tentative conditions after a predetermined number of states, at which time the value of the one or more tentative conditions is no longer tentative, but determinative of the next state information;
   (f) invoking a reset condition, aborting execution of the steps in the another state machine, and returning execution to a predetermined step in the first state machine, if the one or more conditions of the evaluating and reevaluating steps are inconsistent; and
   (g) terminating the execution of the first state machine and continuing the execution of the steps in the another state machine, if the one or more conditions of the evaluating and reevaluating steps are consistent.

10. The method as defined in claim 9, wherein the one or more conditions include branch condition codes.

11. The method as defined in claim 10, wherein the branch condition codes include primitive vertex coordinate information.

12. The method as defined in claim 9, wherein the first state machine is a primitive transformation state machine.

13. The method as defined in claim 9, wherein the second state machine is a clipping state machine.

14. A system for improving execution in a graphics accelerator comprising having a plurality of state machines, the plurality of state machines having a shared data and control bus, the system comprising:
   a controller for controlling the execution of the plurality of state machines, the controller particularly adapted to provide limited parallel execution of the plurality of state machines;
   a read only memory (ROM) containing program code executed by the controller;
   a code location including information relating to branching conditions;
   a first state machine defined to execute a plurality of steps, and having a predetermined sequence ending state S1;
   second and third state machines, defined by the controller to substantially execute after the execution of the first state machine, but the second and third state machines having one or more steps for execution in parallel with one or more steps of the first state machine;
   evaluation means for evaluating the code location at a state S2 that occurs prior to the occurrence of state S1;
   branching means responsive to the evaluation means for branching to the second state machine prior to the occurrence of state S1;
   reevaluation means, operative upon or after the occurrence of state S1, for reevaluating the code location; and
   terminating means responsive to the reevaluation means for terminating execution of the second state machine if the code location has changed since evaluation by the evaluation means, the terminating means further operative to return operation back to first state machine at a predetermined point of operation.

15. The system as defined in claim 14, further including a memory segment for storing data needed for the execution of the first state machine, after the execution of state S2.

16. The system as defined in claim 15, further including protection means for protecting the integrity of the data stored in the memory segment.

17. The system as defined in claim 16, further including means responsive to the termination means to deactivate the protection means, and relinquish the protection on the memory segment.

18. The system as defined in claim 14, wherein the ROM forms part of the controller.

19. The system as defined in claim 14, wherein the code location includes a condition code register.

20. The system as defined in claim 14, wherein the first state machine is a transform state machine.

21. The system as defined in claim 14, wherein the second state machine is a clipping state machine.

22. The system as defined in claim 14, wherein the third state machine is a plane equation state machine.

23. The system as defined in claim 14, wherein the termination means includes a power-up reset signal.

24. A computer readable storage medium containing program code for controlling the speculative execution of state machine operation in a graphics accelerator, comprising:
   (a) a first code segment for executing steps in a first state machine operating on a graphic primitive;
   (b) a second code segment for receiving the second to last primitive vertex parameters;
   (c) a third code segment for evaluating one or more conditions that indicate whether steps in a second state machine need to be executed, based upon the primitive vertex parameters already received;
   (d) a fourth code segment for branching and beginning execution of steps in another state machine, based upon the tentative conditions, and continuing execution of the steps in the transformation state machine in parallel with the continued execution of the steps in the another state machine;
   (e) a fifth code segment for reevaluating the one or more conditions after a predetermined number of states, at which time the value of the one or more conditions is no longer tentative, but determinative of the next state information;

(f) a sixth code segment for invoking a reset condition, aborting execution of the steps in the another state machine, and returning execution to a predetermined step in the first state machine, if the one or more conditions of the evaluating and reevaluating steps are inconsistent; and (g) a seventh code segment for terminating the execution of the first state machine and continuing the execution of the steps in the another state machine, if the one or more conditions of the evaluating and reevaluating steps are consistent.

25. A computer readable storage medium containing program code for controlling the execution of a graphics accelerator comprising having a plurality of state machines, the plurality of state machines having a shared data and control bus, the graphics accelerator comprising:

a controller for controlling the execution of the plurality of state machines, the controller particularly adapted to provide limited parallel execution of the plurality of state machines;

a read only memory (ROM) containing program code executed by the controller;

a code location including information relating to branching conditions;

a first state machine defined to execute a plurality of steps, and having a predetermined sequence ending state S1;

second and third state machines, defined by the controller to substantially execute after the execution of the first state machine, but the second and third state machines having one or more steps for execution in parallel with one or more steps of the first state machine;

evaluation means for evaluating the code location at a state S2 that occurs prior to the occurrence of state S1;

branching means responsive to the evaluation means for branching to the second state machine prior to the occurrence of state S1;

reevaluation means, operative upon or after the occurrence of state S1, for reevaluating the code location; and terminating means responsive to the reevaluation means for terminating execution of the second state machine if the code location has changed since evaluation by the evaluation means, the terminating means further operative to return operation back to first state machine at a predetermined point of operation.

* * * * *